Patented May 3, 1927.

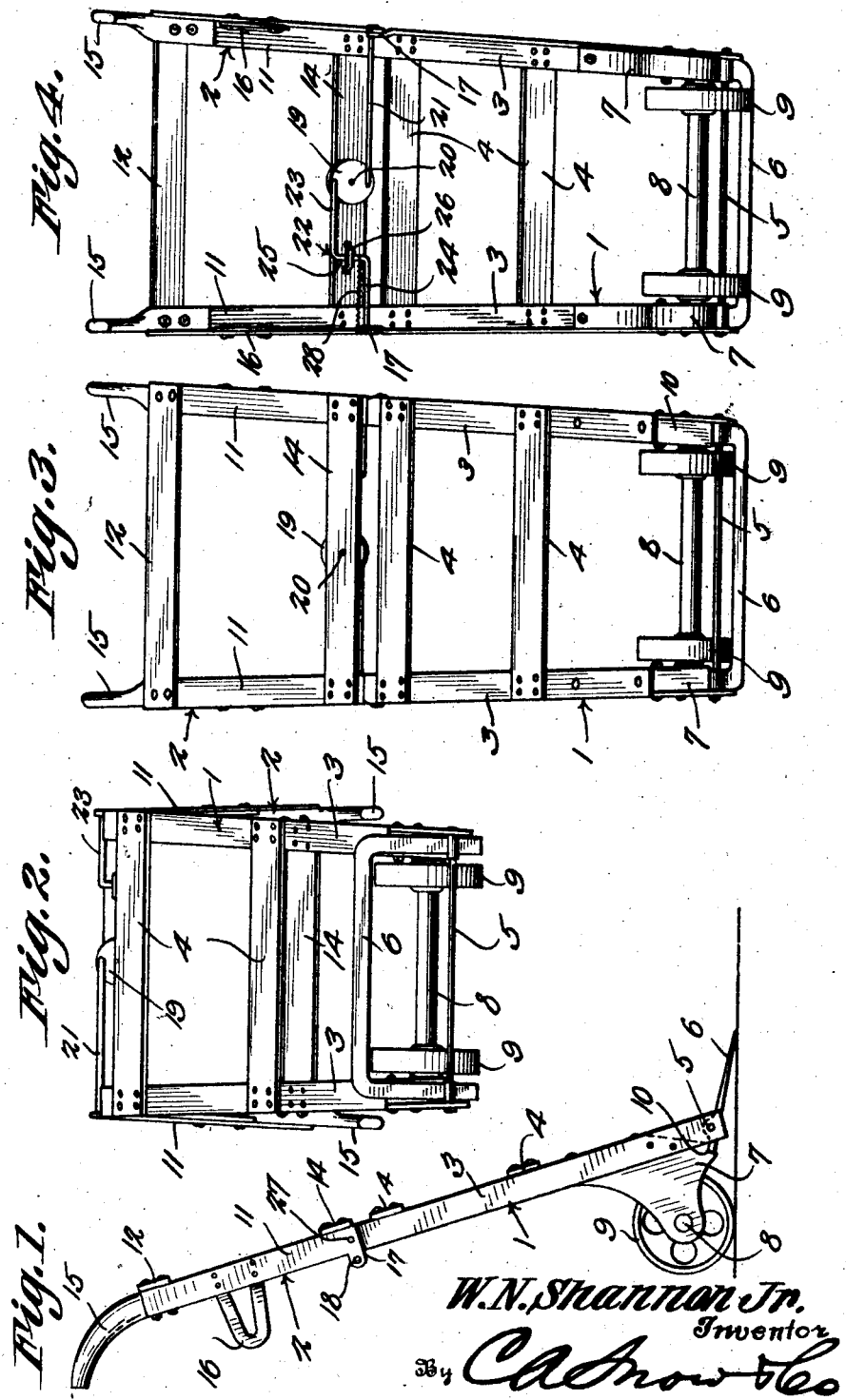

1,627,253

UNITED STATES PATENT OFFICE.

WALTER N. SHANNON, JR., OF SAN BERNARDINO, CALIFORNIA.

TRUCK.

Application filed November 6, 1925. Serial No. 67,315.

This invention aims to provide a truck which may be folded up into small compass, when not in use, novel means being provided for holding the parts of the truck rigidly in position when the truck is in use.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1 shows in side elevation, a device constructed in accordance with the invention; Figure 2 is a front elevation wherein the truck is shown folded; Figure 3 is a front elevation of the truck extended and in working position; Figure 4 is a rear elevation of the truck extended and in working position.

The truck forming the subject matter of this application includes a frame made up of a lower section 1 and an upper section 2, the lower section 1 embodying side rails 3 connected by cross slats 4, and by a support or rod 5 to which a foot 6 is hinged intermediate its ends. Bearings 7 are mounted on the siderails 3 of the lower section 1 and project rearwardly therefrom. A shaft 8 is mounted in the bearings 7 and carry the truck wheels 9. The bearings 7 have seats 10 in their lower edges. The rear end of the foot 6 is received in the seats 10. Because the foot 6 is engaged with the bearings 7, the foot cannot swing downwardly below the position shown in Figure 1. The foot, therefore, is held in such a position that it will support a load. Furthermore, because the rear end of the foot 6 is received in the seats 10, the rearward thrust of the foot 6 is received by the bearings 7, and the hinged mounting of the foot on the support or rod 5 will not be strained unduly.

The upper section 2 of the truck frame comprises side rails 11 overlapped at their lower ends on the upper ends of the side rails 3 of the lower section 1. The side rails 11 are connected by an upper cross slat 12 and by a lower cross slat 14, handles 15 being mounted on the upper ends of the side rails 11. Near to their upper ends, the side rails 11 carry feet 16, which, cooperating with the wheels 9, support the truck frame in an approximately horizontal position when the legs 16 rest on the ground. The upper ends of the side rails 3 of the lower section 1, and the lower ends of the side rails 11 of the upper section 2 are provided with rearwardly extended ears 17 which are pivotally connected as indicated at 18.

A rotary member 19 is supported for rotation, as at 20, on the cross rail 14 of the upper frame section 2. A spring latch 21 is pivoted at its inner end to the rotary member 19, eccentrically thereof. The numeral 22 marks an angular latch comprising an inner part 23 and an outer part 24 disposed parallel to each other, and united at their inner ends by a rectangularly disposed connection 25 mounted to slide in a guide 26 on the cross slat 14. The inner end of the part 23 of the latch 22 is pivotally mounted on the rotary member 19, eccentrically thereof. The outer ends of the latch elements 21 and 24 slide in openings or seats 27 which are fashioned in the overlapped ends of the frame rails 3 and 11. A retractile spring 28 is connected at its inner end to the part 25 of the latch 22, and is connected at its outer end to one of the side rails 11 of the upper frame section 2. The spring 28 tends to draw the latch member 22 to the left in Figure 4 and to maintain the part 24 of the latch 22 engaged in the openings or seats 27 at one side of the truck. The spring 28, acting through the latch 22, rotates the member 19 and advances the latch 21, so that the latch 21 is held engaged with the openings or seats 27 and the corresponding sides of the truck frame. Owing to the way in which the latches 22 and 21 operate, the sections 1 and 2 are prevented from folding with the pivot points 18 as a center. By rotating the member 19, the latches 22 and 21 may be retracted, thereby setting the upper section 2 of the truck frame free, so that that section may be folded downwardly and rearwardly, as shown in Figure 2. The foot 6 of the truck may be folded upwardly from the position of Figure 1 to the position of Figure 2, the entire truck, then, being disposed in compact condition, so that it may be carried about readily in a vehicle, or stowed in small compass, either in a warehouse, or during shipment.

What is claimed is:—

1. A truck comprising a frame, a bearing on the frame, a wheel journaled on the bearing, and a foot pivotally mounted intermediate its ends on the frame, the rear end of the foot being engaged with the lower surface of the bearing when the forward end of the foot is swung downwardly into operative position, and the forward end of the foot engaging the forward surface of the bearing when the forward end of the foot is swung upwardly into an inoperative position.

2. A truck comprising a frame, a bearing on the frame, a wheel journaled on the bearing, and a foot pivotally mounted intermediate its ends on the frame, the rear end of the foot being engaged under the bearing, against upward swinging movement, and the rear end of the foot being engaged with the bearing against rearward movement.

3. A truck comprising hingedly connected upper and lower sections, a wheel journaled on the lower section, a foot mounted on the lower section, a rotary member journaled on one section of the truck, oppositely disposed latches pivoted at their inner ends to the rotary member and engaged at their outer ends with both sections of the truck, one of the latches having an off-set portion which permits that latch to be pivoted to the rotary member in spaced relation to the other latch, and a spring connected to one section of the truck and to the off-set portion of said latch.

In testimony that I claim the foregoing as my own, I have hereto affixed my signature.

WALTER N. SHANNON, Jr.